June 21, 1955 G. S. JONES 2,711,259
INBOARD BOAT TRANSPORTATION AND LAUNCHING TRAILER
Filed Nov. 9, 1951 2 Sheets-Sheet 1
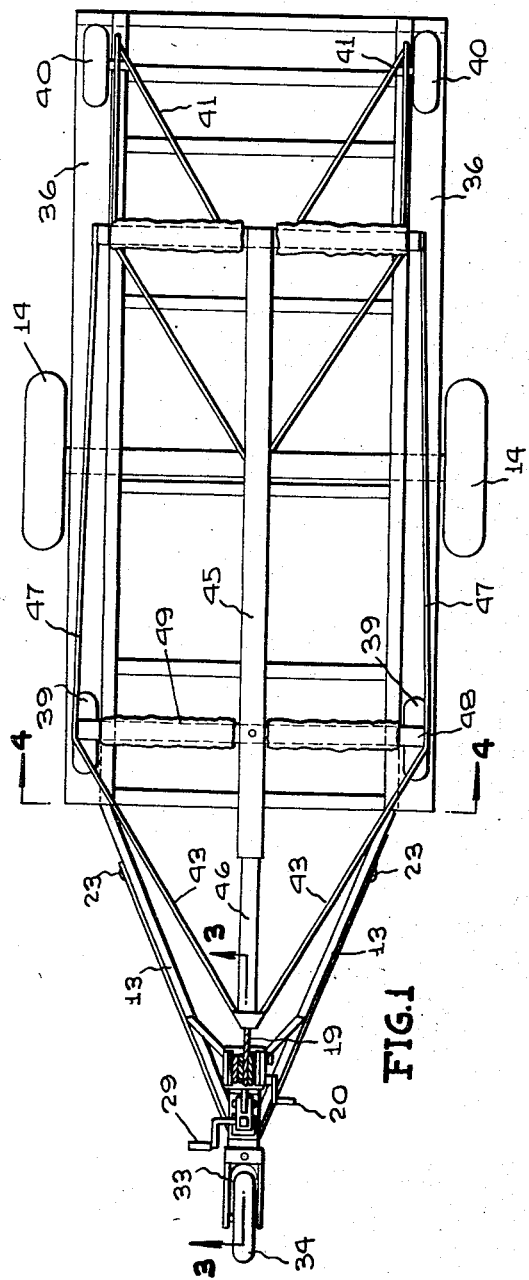
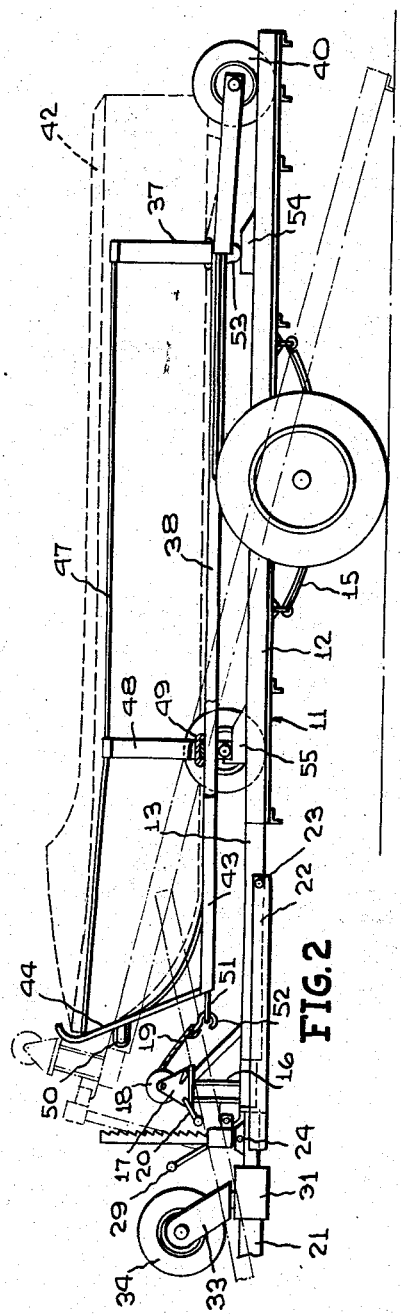
Inventor
GARLAND S. JONES
By
McMorrow, Berman & Davidson
Attorneys June 21, 1955 G. S. JONES 2,711,259
INBOARD BOAT TRANSPORTATION AND LAUNCHING TRAILER
Filed Nov. 9, 1951 2 Sheets-Sheet 2

Inventor
GARLAND S. JONES
By
McMorrow, Berman & Davidson
Attorneys

United States Patent Office 2,711,259
Patented June 21, 1955

2,711,259

INBOARD BOAT TRANSPORTATION AND LAUNCHING TRAILER

Garland S. Jones, Beaumont, Tex.

Application November 9, 1951, Serial No. 255,608

4 Claims. (Cl. 214—506)

This invention relates to boat trailers, and more particularly to an improved transportation and launching trailer for a boat of the inboard type.

The main object of the invention is to provide a novel and improved means for transporting a boat, and particularly a boat of the inboard type, said means being simple in construction, being easy to attach to a conventional automobile, and providing a means of safely and securely transporting an inboard boat.

A further object of the invention is to provide an improved transportation and launching trailer for boats of the inboard type, the trailer involving inexpensive components, providing a means of easily launching a boat carried thereon, being durable in construction, and being operable by a single person to either mount a boat on the trailer device for transportation or to launch a boat carried by the trailer device.

Further objects and advantages of the invention will become apparent from the following description and claims, and from the accompanying drawings, wherein:

Figure 1 is a top plan view of an improved, completely assembled transporting means according to the present invention.

Figure 2 is a side elevational view of the boat transporting means of Figure 1, an inboard boat being represented in dotted view as being supported on said means.

Figure 3:
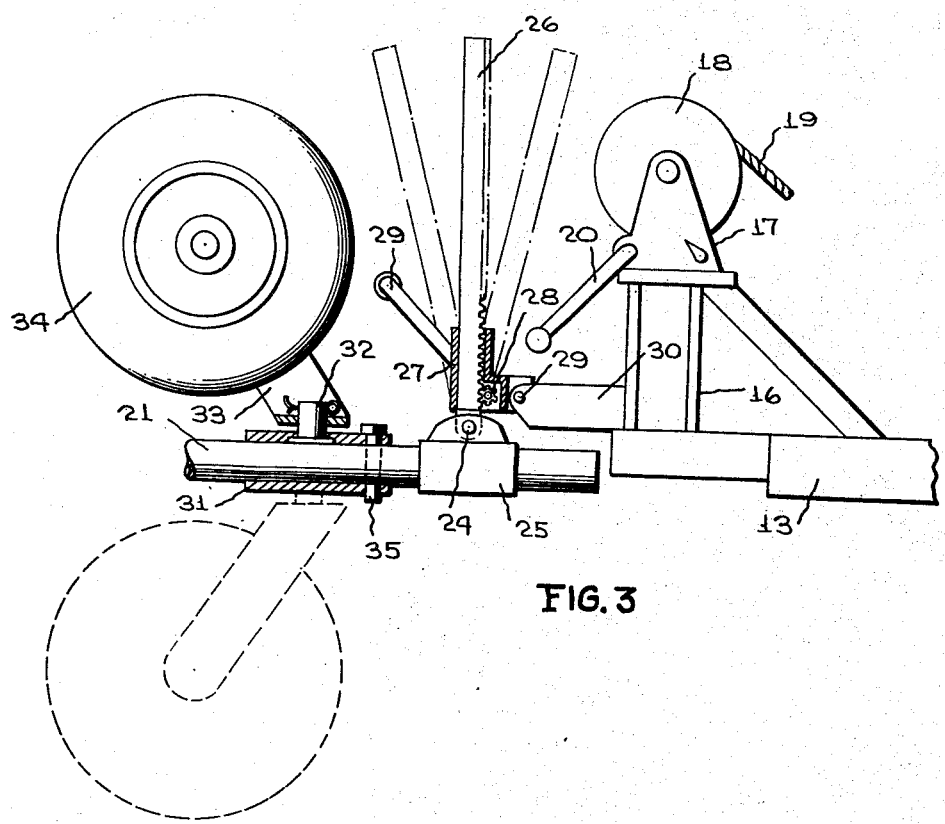
Figure 3 is an enlarged cross sectional detail view taken on the line 3—3 of Figure 1.

Referring to the drawings, 11 designates the main member of the boat transporting means, said member comprising a frame 12 having a rectangular main body to the forward end of which are secured the forwardly convergent frame bars 13, 13. The main body 12 has rotatably secured thereto on an intermediate transverse axis the ground-engaging wheels 14, 14. The axle of the wheels 14, 14 is preferably connected to the main portion 12 of the frame 11 through conventional cushioning springs 15. Additional transverse axles and ground-engaging wheels may be provided for the body 12 if so desired.

Rigidly secured to the junction of the convergent frame bars 13, 13 is an upstanding supporting structure 16 on which is mounted the winch 17, said winch including a reel 18 on which is wound a cable 19. The winch 17 is conventional in construction and includes the operating handle 20.

Designated at 21 is a longitudinally extending hitching shaft provided on its forward end with means, not shown, for pivotally connecting said shaft to the trailer hitch structure of a conventional automobile. Rigidly secured to the rear end of the shaft 21 are the rearwardly divergent bar members 22, 22 which are pivotally connected at 23, 23 to the rear portions of the frame bars 13, 13. Pivotally connected at 24 to a bracket sleeve 25 rigidly secured to the hitching shaft 21 is an upstanding rack bar 26. Slidably engaged on the rack bar 26 is a sleeve 27 in which is journaled a pinion 28 meshing with the teeth of the rack bar 26. Connected to the pinion shaft is a crank handle 29, enabling the pinion 28 to be rotated manually, whereby the sleeve 27 is elevated relative to the rack bar 26. The sleeve 27 is pivotally secured at 29 to a forwardly extending arm 30 rigidly secured to the upstanding winch supporting structure 16. It will be readily apparent that when the sleeve 27 is elevated, as above described, the forward end of the main supporting frame 12 will be elevated, as for example to the dotted view position thereof shown in Figure 2.

When the sleeve 27 has been elevated relative to the rack bar 26, the sleeve will remain in its elevated position unless the crank handle 29 is manually rotated to cause said sleeve to descend, because of the friction between the sleeve 27 and the rack bar 26 and the friction between the teeth of the relatively small pinion 28 and the teeth of the rack bar 26.

Rotatably mounted on the hitching shaft 21 forwardly of the rigid sleeve 25 is a sleeve 31 having secured thereto a radial stud 32 on which is rotatably mounted the caster yoke 33. Journaled between the legs of the caster yoke 33 is the front ground-engaging wheel 34. Designated at 35 is a pin member which extends through a vertical, diametrically arranged bore in the hitching shaft 21 and which is arranged to extend through the sleeve 31 to lock said sleeve against rotation relative to the shaft 21 in either the full line position shown in Figure 3, wherein the ground-engaging wheel 34 is in an upwardly extending position, or in the dotted line position shown in Figure 3, wherein the ground-engaging wheel 34 is in a depending position. The ground-engaging wheel 34 is locked in its depending position, as shown in dotted view in Figure 3, when the device is detached from the trailer hitch structure of an automobile, allowing the main trailer member 11 to be supported in a horizontal position on the ground, and the ground-engaging wheel 34 is locked in its upstanding position, as shown in full line view in Figure 3 when the trailer hitching shaft 21 has been connected to the trailer hitch structure of the automobile, whereby the forward end of the main trailer body 11 is supported by the trailer hitch connection to the automobile.

Figure 4:
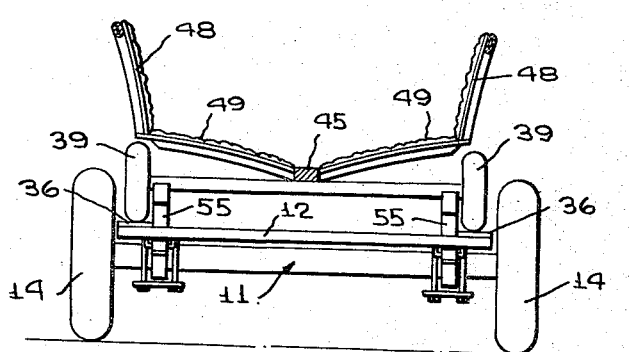
Figure 4 is a transverse vertical cross sectional view taken on the line 4—4 of Figure 1.

The rectangular main portion 12 of the frame 11 is provided on its opposite longitudinal marginal portions with the respective longitudinally extending ramps 36, 36. Designated at 37 is a launching trailer comprising a generally rectangular wheeled frame 38, the frame being provided with the forward wheels 39, 39 and the rear wheels 40, 40, spaced apart so as to engage on the ramps 36, 36 when the trailer 37 is hauled onto the main trailer member 11. As shown in Figure 1, the rear wheels 40, 40 are journaled on triangular, rearwardly extending frames 41, 41 which define between them a rearwardly flaring space providing clearance for the propeller and rudder of a typical inboard boat, such as shown in dotted view at 42, when said boat is mounted on the launching trailer 37. The forward end of the frame 38 of the launching trailer includes the convergent bar members 43, 43 and the upwardly and forwardly inclined bar member 44. The frame 38 also includes a longitudinal center bar 45 whose forward end is connected to the front bar 44 by an arcuately curved brace member 46. Designated at 47, 47 are longitudinally extending side rods which are rigidly connected to the top ends of respective pairs of opposing angular cradle members 48, 48 secured to the center bar 45 and the respective longitudinal lower side bars of the frame 38 of the launching trailer 37. As shown in Figure 4, the cradle members 48, 48 define a cross sectional configuration adapted to receive a boat of the type illustrated in dotted view at 42 in Figure 2. The cradle members 48, 48 are provided with suitable padding 49 to prevent injury to the surfaces of the boat resting on said cradle members.

Secured to the front bar 44 at its upper portion is a hitching loop 50, and designated at 51 is another hitching loop provided at the junction of the forwardly convergent bar members 43, 43. The hook of the winch 17, designated at 52, is adapted to be engaged with either of the loops 51 or 50.

Designated at 53, 53 are depending abutment elements provided on the rear end portion of the launching trailer frame 38, said depending abutment elements being adapted to engage on wedge-shaped supporting blocks 54 provided on the rear portions of the main trailer frame member 12. Additional wedge-shaped blocks 55 are provided on the main under frame 12 arranged to supportingly engage beneath the axle of the front launching trailer wheels 39, 39, when the launching trailer is mounted on the main trailer member 11. The blocks 54 and 55 therefore remove the load from the launching trailer wheels 39, 39 and 40, 40 when the launching trailer is fastened onto the main trailer member for transportation of a boat, in the manner illustrated in Figure 2.

In preparing a boat for transportation, the boat is first mounted in any suitable manner on the launching trailer 37 and is secured thereon. The body 12 of the main trailer member is then inclined to the dotted line position shown in Figure 2 by means of the jack device defined by rack bar 26 and pinion 28, using the handle 29 to elevate the sleeve 27 relative to the rack bar 26 in the manner above described. The launching trailer is then aligned with the tilted frame 12 and the hook 52 is engaged in the loop 51. The winch 17 is then operated by means of its handle 29 to draw the launching trailer onto the inclined frame 12, and when the launching trailer has been moved onto the main frame 12 to a position wherein the wedge blocks 55 and 54 supportingly engage beneath the launching trailer, in the manner shown in Figure 2, the crank handle 29 of the jack means is rotated to lower the forward end of the launching trailer to the position thereof shown in full line view in Figure 2, whereby the boat 42, and the launching trailer 37 supporting same, are in a horizontal position. The main trailer member 11 may then be moved into proper position behind the automobile to which it is to be hitched and the hitch bar 21 may then be connected to the trailer hitch structure of the automobile. The pin 35 may then be moved and the front ground-engaging wheel 34 of the boat trailer main member 11 may be rotated to its upstanding full line position, as shown in Figures 2 and 3, in which position it may be locked by reinserting the locking pin 35. The boat is then ready for transportation to its desired destination.

To remove the boat from the trailer the reverse procedure is followed, the launching trailer first being removed from the main trailer member 11, whereupon the boat 42 may be removed therefrom. Obviously, the launching trailer may be allowed to slide directly into the water carrying the boat 42, and may be detached from the boat subsequent to launching.

The winch 17 includes suitable manually releasable ratchet locking means preventing the cable 19 from becoming unwound from the reel 18 during the transportation of the trailer and preventing unwinding of said cable until the winch has been manually released for unwinding.

While a specific embodiment of an improved inboard boat transportation and launching trailer apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a trailer, an elongated frame having front and rear ends, a pair of ground-engaging wheels on and depending from said frame at a point spaced from said ends, said frame having tracks extending along opposite sides thereof, a boat cradle having front and rear ends, front track-engaging wheels depending from a forward part of said cradle, rear track-engaging wheels depending from a rearward part of said cradle, said front and rear cradle wheels supporting said cradle on said frame and providing for rearward movement of said cradle from a forward frame supported position to a rearward cradle-unloading position off the rear end of said frame wherein the rear track-engaging wheels rest upon the ground, winch means on the front end of said frame including a cable connected to the front end of the cradle, and means for operating said winch means to draw said cradle forwardly from a rearward cradle-unloading position to its forward frame supported position, forward block means on a forward part of said tracks, said forward block means comprising ramp means, said ramp means serving to engage and elevate parts of said front track-engaging wheels and elevate the front track-engaging wheels onto said front block means as the cradle is moved into supported position with the front track engaging wheels elevated above the tracks.

2. In a trailer, an elongated frame having front and rear ends, a pair of ground-engaging wheels on and depending from said frame at a point spaced from said ends, said frame having tracks extending along opposite sides thereof, a boat cradle having front and rear ends, front track-engaging wheels depending from a forward part of said cradle, rear track-engaging wheels depending from a rearward part of said cradle, said front and rear cradle wheels supporting said cradle on said frame and providing for rearward movement of said cradle from a forward frame supported position to a rearward cradle-unloading position off the rear end of said frame wherein the rear track-engaging wheels rest upon the ground, winch means on the front end of said frame including a cable connected to the front end of the cradle, and means for operating said winch means to draw said cradle forwardly from a rearward cradle-unloading position to its forward frame supported position, forward block means on a forward part of said tracks, said forward block means comprising ramp means, said ramp means serving to engage and elevate parts of said front track-engaging wheels and elevate the front track-engaging wheels onto said front block means as the cradle is moved into supported position with the front track engaging wheels elevated above the tracks, and rear block means on a rearward part of said tracks, said rear block means comprising rear ramp means, and said cradle having abutments depending from the rear end thereof arranged to ride up the rear ramps and rest upon the rear block means and elevate the rear track engaging wheels above the tracks as the cradle is moved into its forward cradle supported position.

3. In a trailer, an elongated frame having front and rear ends, a pair of ground-engaging wheels on and depending from said frame at a point spaced from said ends, said frame having tracks extending along opposite sides thereof, a boat cradle having front and rear ends, front track-engaging wheels depending from a forward part of said cradle, rear track-engaging wheels depending from a rearward part of said cradle, said front and rear cradle wheels supporting said cradle on said frame and providing for rearward movement of said cradle from a forward frame supported position to a rearward cradle-unloading position off the rear end of said frame wherein the rear track-engaging wheels rest upon the ground, winch means on the front end of said frame including a cable connected to the front end of the cradle, and means for operating said winch means to draw said cradle forwardly from a rearward cradle-unloading position to its forward frame supported position, and other ground-engaging wheel means on and projecting forwardly from the front end of said frame, and vertically adjustable mounting means mounting said other ground-engaging wheel means on the frame.

4. In a trailer, an elongated frame having front and rear ends, a pair of ground-engaging wheels on and depending from said frame at a point spaced from said ends, said frame having tracks extending along opposite sides thereof, a boat cradle having front and rear ends, front track-engaging wheels depending from a forward part of said cradle, rear track-engaging wheels depending from a rearward part of said cradle, said front and rear cradle wheels supporting said cradle on said frame and providing for rearward movement of said cradle from a forward frame supported position to a rearward cradle-unloading position off the rear end of said frame wherein the rear track-engaging wheels rest upon the ground, winch means on the front end of said frame including a cable connected to the front end of the cradle, and means for operating said winch means to draw said cradle forwardly from a rearward cradle-unloading position to its forward frame supported position, and other ground-engaging wheel means on and projecting forwardly from the front end of said frame, and vertically adjustable mounting means mounting said other ground-engaging wheel means on the frame, said mounting means comprising means pivoting said other ground-engaging wheel means for movement on vertical and horizontal axes.

References Cited in the file of this patent

UNITED STATES PATENTS

| | | |
|---|---|---|
| 428,551 | Carter | May 20, 1890 |
| 2,216,972 | Gibson et al. | Oct. 8, 1940 |
| 2,332,326 | Lex | Oct. 19, 1943 |
| 2,389,338 | Zorc, Jr. | Nov. 20, 1945 |
| 2,418,567 | Ausherman | Apr. 8, 1947 |
| 2,444,690 | Almendinger et al. | July 6, 1948 |
| 2,485,793 | Vassar | Oct. 25, 1949 |
| 2,628,733 | Hale | Feb. 17, 1953 |

FOREIGN PATENTS

| | | |
|---|---|---|
| 726,877 | France | Mar. 14, 1932 |
| 446,483 | Great Britain | Apr. 30, 1936 |
| 496,549 | Great Britain | Nov. 28, 1938 |
| 541,205 | Great Britain | Nov. 17, 1941 |